United States Patent [19]
Wetherbee, Jr.

[11] 3,980,359
[45] Sept. 14, 1976

[54] BALL BEARING

[75] Inventor: Arthur E. Wetherbee, Jr., Manchester, Conn.

[73] Assignee: United Technologies Corporation, Hartford, Conn.

[22] Filed: May 8, 1975

[21] Appl. No.: 575,683

[52] U.S. Cl. ............................. 308/187; 308/235
[51] Int. Cl.² ......................................... F16C 1/24
[58] Field of Search ............... 308/187, 187.1, 201, 308/217, 235

[56] References Cited
UNITED STATES PATENTS

| | | | |
|---|---|---|---|
| 3,027,206 | 3/1962 | Potter | 308/201 |
| 3,366,429 | 1/1968 | Fawick | 308/201 |
| 3,528,711 | 9/1970 | Atkinson | 308/187 |

*Primary Examiner*—Robert R. Song
*Assistant Examiner*—Richard A. Bertsch
*Attorney, Agent, or Firm*—Norman Friedland

[57] ABSTRACT

A lubricating system for high speed ball bearings includes forming the cage into a scalloped ring and rotatably supporting it in an annular channel formed in the inner split race centrally of the balls and judiciously locating lubricating passageways in the inner split race to communicate with this channel and where the side walls of the scalloped ring and the channel are dimensioned to define a gap for leading lubricant to and from internally of the bearing. This provides positive lubrication for the cage, balls and races by the same lubricant flow while also achieving unrestricted discharge of the lubricant from the bearing interior.

9 Claims, 7 Drawing Figures

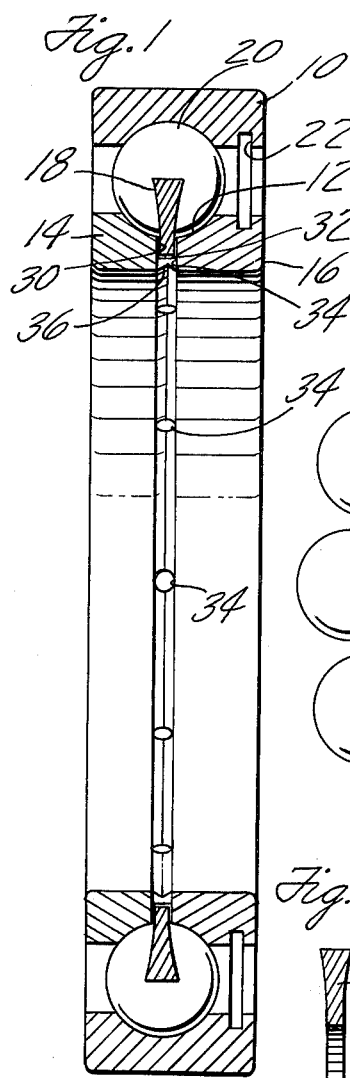
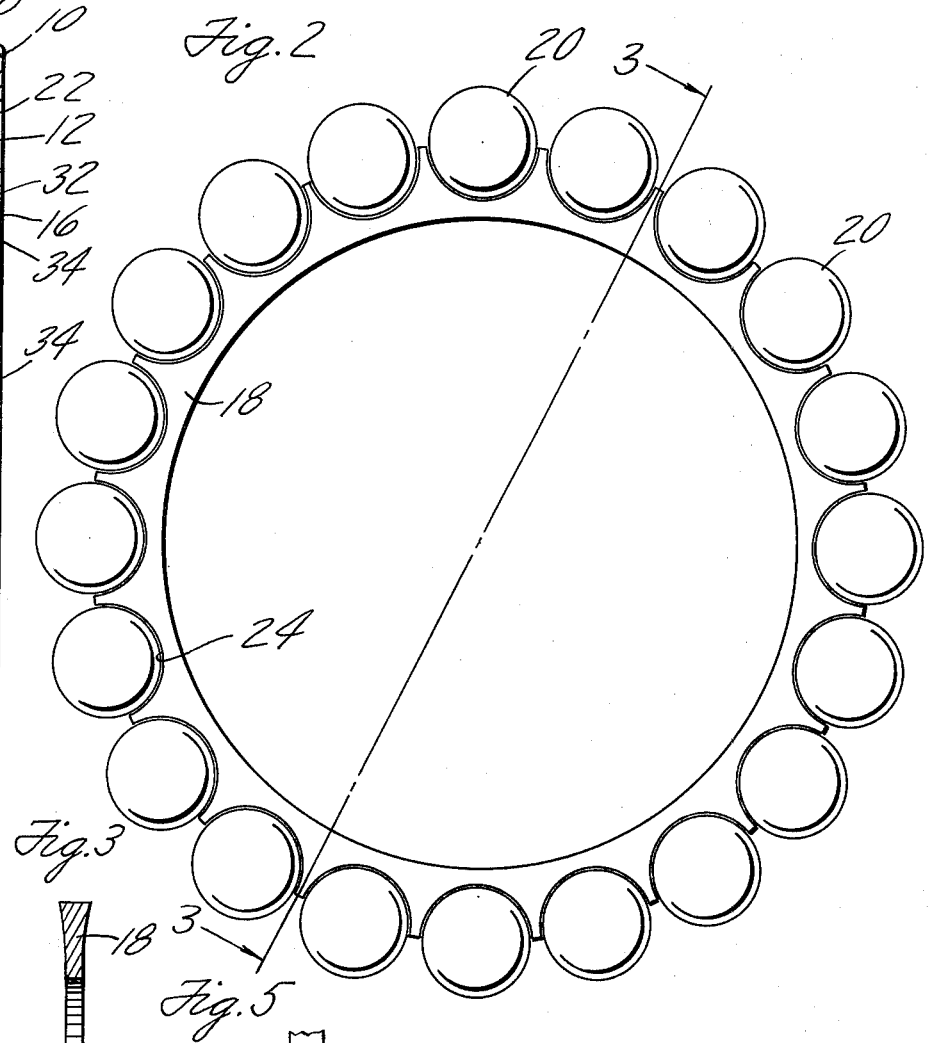
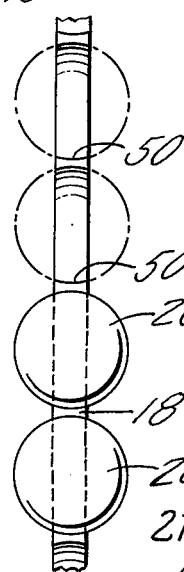
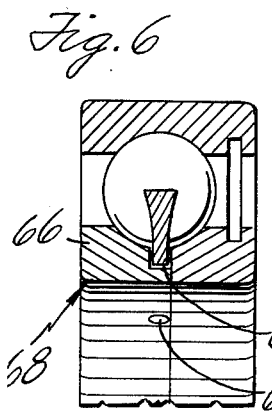
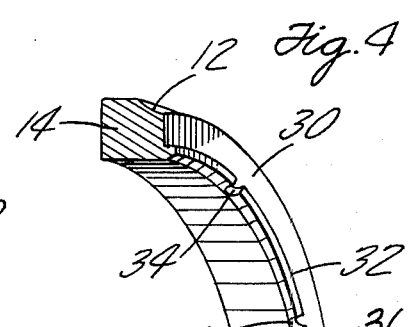

BALL BEARING

BACKGROUND OF THE INVENTION

This invention relates to ball bearings and particularly to means for lubricating the same.

Obviously, the life of a bearing is directly related to the lubrication or lack of lubricaton of its wear surfaces. Typically, the cage for the balls is a disc-like element that spans the spherical balls and carries a plurality of pockets spacing each ball. This cage is normally restrained axially by the balls and radially by lands formed on the inner or outer races and occupies a relatively large portion of the space. Thus, not only is it difficult to lubricate from an external source, it restricts discharge of lubricant from the bearing interior.

For the purpose of this application, it is to be understood that the races are the inner surfaces that bear against the balls and are formed in the rings. Hereinafter, reference to the ring includes its race portion.

In a high speed bearing it is desirable to obtain positive lubrication to the cage-ring interface as well as providing an adequate flow of lubricant to the interior of the bearings. Heretofore, a conventional method of obtaining adequate lubrication of the cage-ring interface was to provide separate lubricant passages in the inner ring.

I have found that by providing a cage formed into a scalloped ring or disc-like element which rides on its inner diameter in a circumferential slot or channel formed in the inner split ring and providing lubricant passages formed in the inner ring terminating at the slot, the lubricant is admitted into the slot to provide good lubrication of the cage/ring interface, and passes between the side walls of the channel and cage where this lubricant is pumped from the channel to the balls and wear surfaces of the inner and outer races. Hence, the same lubricant is used to first lubricate the cage-ring interface and then lubricate the balls and rings. This invention contemplates free discharge of lubricant from the bearing through the radial spaces between inner and outer rings.

Hence, the cage is restrained axially and radially by the inner ring. It has minimum mass and provides positive flow of lubricant to and unrestrictive flow from the bearing interior. Additionally, it permits minimal spacing of balls or maximum space for ball excursion with a given ball complement.

SUMMARY OF THE INVENTION

An object of this invention is to provide an improved ball bearing.

A still further object of this invention is to provide for a ball bearing as described a disc-like element scalloped on its outer diameter and rotatably supported in an annular channel or circumferential slot formed in the split inner ring, having lubricant passages communicating therewith.

Other features and advantages will be apparent from the specification and claims and from the accompanying drawings which illustrate an embodiment of the invention.

BRIEF DESCRIPTION OF THE DRAWINGS

FIG. 1 is a sectional view of an assembled ball bearing showing the details of the invention.

FIG. 2 is a view in elevation showing the cage and spherical balls.

FIG. 3 is a sectional view solely of the cage, taken along line 3—3 of FIG. 2.

FIG. 4 is a partial perspective view of the inner ring.

FIG. 5 is a projected view showing the radius of curvature of the serrations of the cage.

FIG. 6 is a partial sectional view illustrating another embodiment of the invention.

FIG. 7 is a partial projected view showing the ball-cage contact areas during operation of the bearing.

DESCRIPTION OF THE PREFERRED EMBODIMENT

Reference is now made to FIGS. 1 to 5 illustrating this invention as comprised of outer ring 10, split inner ring 12 having the fore ring 14 and aft ring 16, cage 18, and a plurality of spherical balls 20 journaled therebetween. The bearing may include puller grooves shown as annular grooves 22 which may be formed on the inner and outer diameters of the outer and inner ring, respectively, and serve as a grip to pull the rings off the shaft (not shown) whereupon it is mounted. Cage 18 is formed from suitable material into a relatively narrow disc-like or ring element having its outer diameter scalloped to form recesses 24 accommodating each of the balls. As shown in FIG. 3 the width of the cage element 18 may be made to be wider at the top and neck down to parallel side walls adjacent the inner diameter, although this particular configuration is not deemed to be a limitation to the scope of the invention. It is noted, however, that the width of cage 18 spans a narrow distance of balls 20 and the cage is mounted centrally with respect to the plane transversing the rotating center line. It also will be appreciated that the width of the cage is a matter of design which is generally dictated by the particular use to which the bearing is put. Thus for example the width of the slot 30 for a thrust bearing designed to take loads in either direction will be limited. If the load was unidirectional, for example, the slot may not necessarily be symmetrical about the race mid-plane and the races themselves may not be symmetrical.

The parallel spaced walls of cage element 18 on its inner diameter fit into an annular groove or circumferential slot 30 formed at the inner edges of the fore ring 14 and aft ring 16 of the ring 12. The annular groove extends radially inwardly from the outer diameter a distance short of the overall depth of the inner ring, defining the bottom 32 of the channel which serves as a land for cage 18.

A plurality of lubricating apertures or drilled passages 34 extending radially from the inner diameter to the circumferential slot 30 are provided for admitting lubricant into slot 30. It being noted that each of passages 34 may be drilled in the fore and aft rings 14 and 16 and will not necessarily line up as shown. The oil in the slot ultimately is forced between the side walls of slot 30 and the cage 18 and directed to the internal wear parts of the bearings. The gap defined by the space between the cage and side walls of the slot serves as a pumping cavity and assists in pumping oil into the bearing. A "V" shaped annular groove 36 which may be formed by chamfering the side mating edges on the inner diameter of the fore and aft rings serves to collect oil trapped adjacent the shaft (not shown) and distributes lubricant from the shaft to the bearing. It should be appreciated that the particular shape groove 36 is not deemed important to this invention, and any well known lubricant transfer system may be employed, as for example, by locating the groove in the shaft. Reference should be made to FIG. 4 for a clear showing of the lubricant passageways formed through the inner race.

FIG. 5 shows the curvature of the inner walls of the serrations defining the recesses of the cage for receiving the balls as being concave to complement the shape of the balls. It will be appreciated that the radius of curvature, although not limited thereto, should be somewhat larger than that of the balls and in some instances be infinite.

The contour of the cage recesses and the curvature of the balls and their interrelationships is best shown in FIG. 7. As noted FIG. 7 shows one of the balls 20 in the recess of the cage which is slightly exaggerated to emphasize the operating relationship. Also as shown the radial clearance between ball and cage is larger than the radial clearance between cage and rings so that when it moves radially when rotating in its operating mode the ball when in its lowest position and ring is in its highest the ball won't hit the bottom of its recess in the cage. The ball has a tendency of moving within its recess due to the operating axial and radial loads. The dimension and contour of the side walls of recess 24 is selected with respect to the dimension and contour of balls 20 such that the point at which ball 20 contacts the side wall will align with a substantial circumferential imaginary line 21 drawn through the centers of the balls 20. The dash line A shows the ball when moved into contact with the left wall and dash line B shows the ball when contacting right wall. Hence, since the radius of curvature of the side wall is infinite radial loads on the cage by virtue of the ball contact is minimized. Also, it will be appreciated that balls 20 never contact the bottom of the recess.

FIG. 6 exemplifies a version of the split inner ring where the slots and passageways are formed in a single half of the split ring. Namely, circumferential slot 60, and drilled holes 64 are formed in the fore ring 66 of split ring 68.

In accordance with this invention positive lubrication is provided both for the cage, balls and races, using the same lubricant flow. Because the lubricant is effectively used twice and is well distributed in both instances, it is possible to minimize lubricant flow and minimize the possibility of starving part of the bearing of lubricant. Additionally, there is unrestricted discharge of the lubricant from the bearing interior. This minimizes heat generation due to churning of trapped lubricant, with reduced bearing temperatures and a smaller temperature rise in the lubricant which is particularly important in high speed bearings.

It should be understood that the invention is not limited to the particular embodiments shown and described herein, but that various changes and modifications may be made without departing from the spirit or scope of this novel concept as defined by the following claims.

I claim:

1. A ball bearing construction having an outer race, an inner race and a plurality of balls journaled therebetween, said inner race being defined by a pair of juxtaposed ring elements, a groove centrally disposed relative to the central plane of said balls of at least one of said ring elements, a cage defined by a scalloped ring element having an annular portion on the inner diameter fitting into said groove and dimensioned to be free to rotate therein, the scalloped portion defining recesses being dimensioned to space and receive each of said plurality of balls, and means for lubricating said inner race, said outer races, said cage and said balls comprising at least one radial passage formed on the outer diameter of at least one of said ring elements terminating in said groove for admitting lubricant thereto from external of said bearing, whereby said lubricant in said groove is then directed into the interior of the bearing and discharged therefrom.

2. A ball bearing construction as claimed in claim 1 wherein said groove is formed in both abutting faces of said juxtaposed ring elements.

3. A ball bearing construction as claimed in claim 1 including an annular groove formed in the outer diameter of at least one of said ring elements and communicating with said radial passage.

4. A ball bearing construction as claimed in claim 1 wherein the bottom of said groove defines a land providing a sliding surface for said cage.

5. A ball bearing construction as claimed in claim 1 wherein said scalloped portion includes an upper radially extending portion being wider relative to the remaining portion thereof.

6. A cage construction for a ball bearing having a rotating split inner race defined by a pair of juxtaposed ring elements, an outer race, spherical balls journaled therebetween said cage comprising a scalloped shaped ring element having an annular inner diameter portion centrally supported relative to said balls in an annular groove formed in at least one of said juxtaposed ring elements, and said scalloped shaped portion defining a recess for receiving one of said balls having a substantially infinite radius of curvature at any contact point between said ball and said scalloped shaped ring element and shaped for contact to occur along a circumferential line approximately through the ball centers.

7. A cage construction as claimed in claim 6 wherein the width of said scalloped shaped ring element spans less than the diameter of said ball.

8. A cage construction as claimed in claim 7 wherein said scalloped shaped ring element includes an outer diameter scalloped portion and an inner diameter annular portion, the width being dimensioned such that the outer diameter portion necks down to a narrower dimension at the inner diameter portion.

9. The method of lubricating high speed ball bearings of the type that includes an inner race and outer race, a plurality of balls retained in a cage supported by the inner race comprising the steps of:

continuously admitting lubricant internally of said ball bearing through the inner ring from a radial passage formed in the ring to an annular slot formed in the inner ring that rotatably supports the cage, continuously leading the fluid from said slot through the space between the side wall of the cage and the side wall of the slot into the internal portion of the bearing to lubricate the cage, balls and inner and outer races, and discharging the lubricant from the bearing through the radial openings formed between the cage and the outer race.

\* \* \* \* \*